(12) United States Patent
Yamashita et al.

(10) Patent No.: US 10,718,371 B1
(45) Date of Patent: Jul. 21, 2020

(54) METHOD OF MANUFACTURING CONNECTING ROD MODULE

(71) Applicant: NTN CORPORATION, Osaka (JP)

(72) Inventors: Tomonori Yamashita, Aichi (JP); Takehiro Matsuzuki, Aichi (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/807,329

(22) Filed: Mar. 3, 2020

Related U.S. Application Data

(62) Division of application No. 15/762,223, filed as application No. PCT/JP2016/075408 on Aug. 31, 2016.

(30) Foreign Application Priority Data

Sep. 25, 2015 (JP) .................. 2015-188648

(51) Int. Cl.
| | | |
|---|---|---|
| *F16C 7/02* | (2006.01) | |
| *F16C 19/46* | (2006.01) | |
| *F16C 35/067* | (2006.01) | |
| *F16C 9/04* | (2006.01) | |
| *B22F 7/08* | (2006.01) | |

(52) U.S. Cl.
CPC .............. *F16C 7/02* (2013.01); *B22F 7/08* (2013.01); *F16C 7/023* (2013.01); *F16C 9/04* (2013.01); *F16C 19/466* (2013.01); *F16C 35/067* (2013.01); *F16C 2202/08* (2013.01);
(Continued)

(58) Field of Classification Search
CPC .... F16C 7/02; F16C 7/023; F16C 7/04; F16C 7/06; F16C 7/08; F16C 9/04; F16C 9/06
See application file for complete search history.

(56) References Cited

U.S. PATENT DOCUMENTS

| 3,563,677 A | 2/1971 | Retan |
| 2003/0177999 A1 | 9/2003 | Saito et al. |
| 2008/0233421 A1 | 9/2008 | Tanino et al. |

FOREIGN PATENT DOCUMENTS

| JP | 7-293545 | 11/1995 |
| JP | 2003-343541 | 12/2003 |

(Continued)

OTHER PUBLICATIONS

International Search Report (ISR) dated Nov. 29, 2016 in International (PCT) Application No. PCT/JP2016/075408.

(Continued)

*Primary Examiner* — Richard W Ridley
*Assistant Examiner* — Brian J McGovern
(74) *Attorney, Agent, or Firm* — Wenderoth, Lind & Ponack, L.L.P.

(57) ABSTRACT

A connecting rod module (1) includes: a connecting rod (10), which is formed of a sintered metal; and bearing raceway rings (outer rings (21, 31)), which are press-fitted into a through-hole (11a, 12a), respectively. The connecting rod (10) has a Young's modulus of from 120 GPa or more to 180 GPa or less. The outer rings (21, 31) each have a Young's modulus of from more than 180 GPa to 240 GPa or less. When T represents a radial thickness of each of the outer rings (21, 31), D represents an inner diameter dimension of each of the through-holes (11a, 12a), and I represents an interference between the outer ring (21) and a peripheral wall of the through-hole (11a) or between the outer ring (31) and a peripheral wall of the through-hole (12a), the following equations are established: T=(0.05~0.15)×D; and I=(0.0004~0.004)×D.

3 Claims, 4 Drawing Sheets

(52) U.S. Cl.
CPC ...... *F16C 2220/20* (2013.01); *F16C 2226/12* (2013.01); *F16C 2360/22* (2013.01)

(56) References Cited

FOREIGN PATENT DOCUMENTS

| | | |
|---|---|---|
| JP | 2007-24235 | 2/2007 |
| JP | 2008-231538 | 10/2008 |
| JP | 2012-7664 | 1/2012 |

OTHER PUBLICATIONS

International Preliminary Report on Patentability and Written Opinion of the International Searching Authority dated Mar. 27, 2018 in International (PCT) Application No. PCT/JP2016/075408.
Machine Translation of JP 2007-024235, obtained Feb. 19, 2019.
Machine Translation of JP 2008-231538, obtained Feb. 19, 2019.
Machine Translation of JP 2012-7664, obtained Feb. 19, 2019.

METHOD OF MANUFACTURING CONNECTING ROD MODULE

TECHNICAL FIELD

The present invention relates to a connecting rod module comprising a connecting rod, and a bearing raceway ring that is press-fitted into at least one of a large end portion and a small end portion of the connecting rod.

BACKGROUND ART

The connecting rod includes a small end portion to be coupled to a piston, a large end portion to be coupled to a crankshaft, and a stem portion coupling the small end portion and the large end portion to each other. For example, in Patent Literature 1, there is disclosed a connecting rod module in which an outer ring (tubular member) having a raceway surface formed on an inner peripheral surface thereof is press-fitted into a through-hole of each of the large end portion and the small end portion of the connecting rod.

CITATION LIST

Patent Literature 1: JP 7-293545 A

SUMMARY OF INVENTION

Technical Problem

The small end portion and the large end portion of the connecting rod are each formed into an annular shape, but a region of the connecting rod in a vicinity of the stem portion and the other regions thereof are different in radial thickness. Accordingly, rigidity varies in a circumferential direction. Therefore, when the outer ring is press-fitted into the through-hole of each of the small end portion and the large end portion of the connecting rod, stress applied to the outer ring from the connecting rod varies in the circumferential direction. This varies a deformation amount of the outer ring in the circumferential direction. Thus, a circularity of the raceway surface of the outer ring may be degraded. Although the connecting rod is frequently formed of a forged product made of an ingot material, in a case of a relatively low-powered engine (such as a general-purpose engine to be used in a lawn mower and the like), the connecting rod is sometimes formed of a sintered metal in order to achieve reduction of manufacturing cost. The sintered metal has lower rigidity than the forged product made of an ingot material. Accordingly, when the connecting rod is formed of the sintered metal, a difference in rigidity between the small end portion and the large end portion in the circumferential direction is increased, with the result that differences in the deformation amount of the outer ring among circumferential positions are increased. Thus, the circularity of the raceway surface of the outer ring is prone to be degraded.

Therefore, an object to be achieved by the present invention is to prevent degradation of a circularity of a raceway surface of a bearing raceway ring in a connecting rod module in which the bearing raceway ring (outer ring) is press-fitted into a through-hole of a large end portion and/or a small end portion of a connecting rod formed of a sintered metal.

Solution to Problem

In order to solve the problem described above, according to one embodiment of the present invention, there is provided a connecting rod module, comprising: a connecting rod, which is formed of a sintered metal, and comprises a large end portion, a small end portion, and a stem portion for coupling the large end portion and the small end portion to each other; and a bearing raceway ring, which is fitted (that is, press-fitted), with an interference, into at least one of a through-hole formed in the large end portion and a through-hole formed in the small end portion, wherein the connecting rod has a Young's modulus of from 120 GPa or more to 180 GPa or less, wherein the bearing raceway ring has a Young's modulus of from more than 180 GPa to 240 GPa or less, and wherein when T represents a radial thickness of the bearing raceway ring, D represents an inner diameter dimension of the through-hole into which the bearing raceway ring is press-fitted, and I represents an interference between the bearing raceway ring and a peripheral wall of the through-hole, the following equations are established:

$$T=(0.05\sim 0.15)\times D; \text{ and}$$

$$I=(0.0004\sim 0.004)\times D.$$

As described above, even when the connecting rod is formed of the sintered metal (specifically, the sintered metal having the Young's modulus of from 120 GPa to 180 GPa), deformation of the bearing raceway ring is prevented by forming the bearing raceway ring of a material having a Young's modulus higher than that of the connecting rod (specifically, a material having a Young's modulus of from 180 GPa to 240 GPa). When the connecting rod and the bearing raceway ring are formed of the above-mentioned materials, and the thickness T of the bearing raceway ring and the interference I between the connecting rod and the bearing raceway ring are set to the above-mentioned ranges, distortion of the bearing raceway ring is prevented so that degradation of the circularity of the raceway surface can be prevented.

The method of manufacturing a connecting rod module described above comprises the steps of: forming a green compact, which comprises a large end portion, a small end portion, and a coupling portion for coupling the large end portion and the small end portion to each other; sintering the green compact to form a sintered compact; sizing the sintered compact to form a connecting rod formed of a sintered metal; and press-fitting a bearing raceway ring into at least one of a through-hole formed in the large end portion of the connecting rod and a through-hole formed in the small end portion of the connecting rod.

Advantageous Effects of Invention

As described above, according to the present invention, degradation of the circularity of the raceway surface of the bearing raceway ring in which the bearing raceway ring is press-fitted into the through-hole of the large end portion and/or the small end portion of the connecting rod formed of the sintered metal can be prevented.

DESCRIPTION OF EMBODIMENTS

Now, an embodiment of the present invention is described with reference to the drawings.

Figure 1:
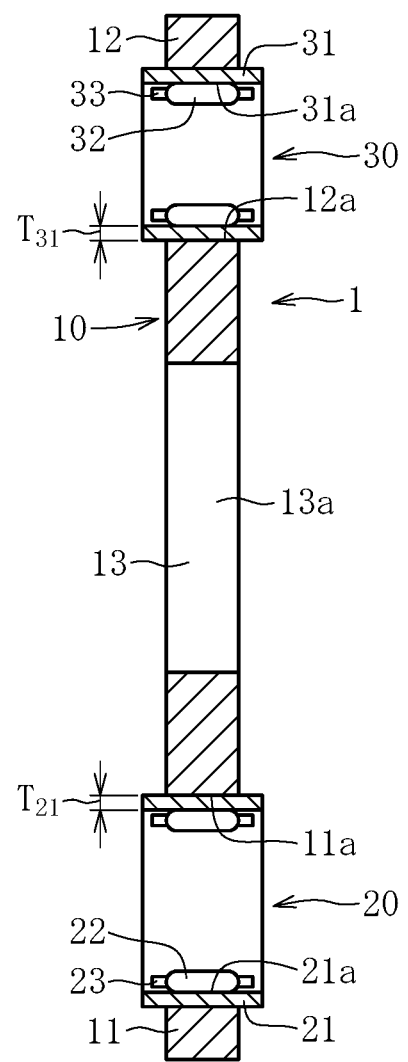
FIG. 1 is a sectional view for illustrating a connecting rod module according to an embodiment of the present invention.

A connecting rod module 1 according to one embodiment of the present invention is incorporated into an engine. For example, the connecting rod module 1 is incorporated into a small-sized engine (general-purpose engine) that has a displacement of 100 cc or less (specifically, a displacement of 50 cc or less) and is provided in a bush cutter, a blower, or the like. As illustrated in FIG. 1, the connecting rod module 1 comprises a connecting rod 10 and roller bearings 20 and 30.

Figure 2:
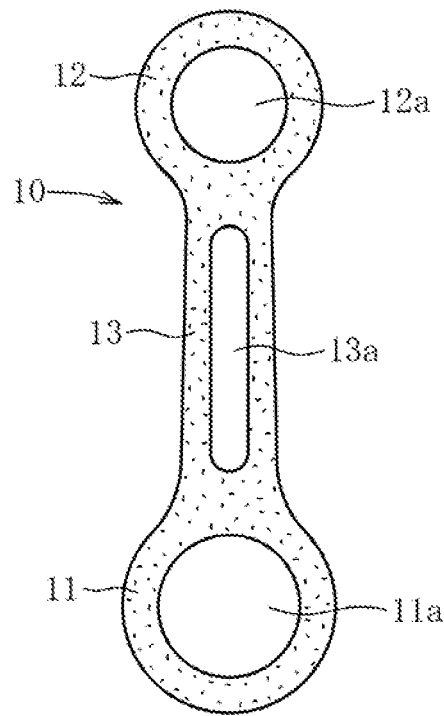
FIG. 2 is a front view for illustrating a connecting rod constructing the above-mentioned connecting rod module.
Figure 3:
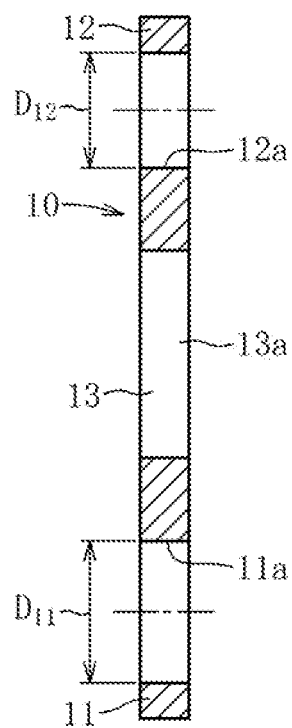
FIG. 3 is a sectional view for illustrating the above-mentioned connecting rod.

As illustrated in FIG. 2 and FIG. 3, the connecting rod 10 integrally comprises an annular large end portion 11, an annular small end portion 12 having a diameter smaller than a diameter of the large end portion 11, and a stem portion 13 coupling the large end portion 11 and the small end portion 12 to each other. A through-hole 11a is formed in the large end portion 11, and a through-hole 12a is formed in the small end portion 12. An inner peripheral surface of the large end portion 11 and an inner peripheral surface of the small end portion 12 (that is, a peripheral wall surrounding (i.e., being continuous all around) the through-hole 11a and a peripheral wall surrounding (i.e., being continuous all around) the through-hole 12a) are each formed into a cylindrical surface. A through-hole 13a is formed in the stem portion 13 to have a shape long and elongate in an extending direction of the stem portion 13 (in an up-and-down direction in the drawings).

The connecting rod 10 is formed of a sintered metal. Specifically, the connecting rod 10 is formed of an iron-based sintered metal containing iron as a main ingredient (for example, an iron content is 80% by mass or more, preferably 90% by mass or more). A Young's modulus of the connecting rod 10 is set to from 120 GPa or more to 180 GPa or less.

A composition of the sintered metal for the connecting rod 10 is selected so that the Young's modulus of the connecting rod 10 is within the above-mentioned range. For example, the sintered metal for the connecting rod 10 contains 0.1% to 5% by mass (preferably 0.5% to 4% by mass) of nickel, 0.1% to 3% by mass (preferably 0.3% to 2.5% by mass) of molybdenum, and 0.05% to 1% by mass (preferably 0.1% to 0.5% by mass) of carbon, and contains iron as the remaining composition.

A density of the connecting rod 10 is set to, for example, 7.0 g/cm$^3$ or more, preferably 7.2 g/cm$^3$ or more. Further, the density of the connecting rod 10 is set to, for example, 7.8 g/cm$^3$ or less, practically 7.6 g/cm$^3$ or less.

As illustrated in FIG. 1, the roller bearing 20 comprises an outer ring 21, which serves as a bearing raceway ring having a raceway surface 21a formed into a cylindrical surface on an inner peripheral surface of the bearing raceway ring, a plurality of rollers 22 (needle rollers) accommodated along an inner periphery of the outer ring 21, and a cage 23 configured to retain the plurality of rollers 22 equiangularly. The roller bearing 30 has the same configuration as that of the roller bearing 20. The roller bearing 30 comprises an outer ring 31, which serves as a bearing raceway ring having a raceway surface 31a formed into a cylindrical surface on an inner peripheral surface of the bearing raceway ring, a plurality of rollers 32 (needle rollers) accommodated along an inner periphery of the outer ring 31, and a cage 33 configured to retain the plurality of rollers 32 equiangularly.

The outer rings 21 and 31 are each formed into, for example, a cylindrical shape, and are press-fitted and fixed in the through-hole 11a of the large end portion 11 and the through-hole 12a of the small end portion 12 of the connecting rod 10, respectively. The outer rings 21 and 31 are formed of a material having a Young's modulus higher than that of the connecting rod 10. Specifically, the outer rings 21 and 31 are formed of a material having a Young's modulus of more than 180 GPa. Meanwhile, when each of the outer rings 21 and 31 has extremely high Young's modulus, processing is difficult. Accordingly, the Young's modulus of each of the outer rings 21 and 31 is set to 240 GPa or less.

The outer rings 21 and 31 according to this embodiment are formed of an ingot material, for example, a steel material. The outer rings 21 and 31 are formed by cutting, forging, pressing, and the like. The outer rings 21 and 31 undergo heat treatment (for example, quenching treatment and tempering treatment) as needed. Thus, a quench-hardened layer is formed on a surface layer of each of the outer rings 21 and 31, with the result that surface hardness, specifically, hardness of the raceway surfaces 21a and 31a is set to HRC 58 or more. Meanwhile, surface hardness of the raceway surfaces 21a and 31a of the outer rings 21 and 31 is set to HRC 65 or less. This value is an upper limit as surface hardness of a general bearing raceway ring that is formed of a steel material and excellent in cost. The raceway surfaces 21a and 31a of the outer rings 21 and 31 undergo finishing (for example, are finished by grinding). Thus, a circularity and a cylindricity of each of the raceway surfaces 21a and 31a are set to, for example, 20 μm or less, preferably 15 μm or less.

In this embodiment, the connecting rod 10 is formed of the sintered metal. Accordingly, rigidity of the large end portion 11 and the small end portion 12 may significantly fluctuate in a circumferential direction. When the outer rings 21 and 31 are respectively press-fitted into the through-holes 11a and 12a of the connecting rod 10 having the above-mentioned configuration, stress applied to the outer rings 21 and 31 from the connecting rod 10 fluctuates significantly. As a result, the outer rings 21 and 31 may be deformed into distorted shapes. In this embodiment, as described above, the outer rings 21 and 31 are each formed of a material having high Young's modulus, that is, a material having high rigidity. Accordingly, distortion of the outer rings 21 and 31 can be prevented.

Further, in this embodiment, the hardness of the raceway surfaces 21a and 31a of the outer rings 21 and 31 are set to high hardness. Accordingly, functions as the raceway surfaces 21a and 31a are ensured, and deformation of the outer rings 21 and 31 can be further prevented when the outer rings 21 and 31 are press-fitted into the through-holes 11a and 12a of the connecting rod 10, respectively.

In addition, in this embodiment, with respect to an inner diameter dimension $D_{11}$ of the through-hole 11a of the large end portion 11, a radial thickness $T_{21}$ of the outer ring 21 (specifically, a thickness in a forming region of the raceway surface 21a) satisfies $T_{21}=(0.05\sim0.15)\times D_{11}$. Similarly, with respect to an inner diameter dimension $D_{12}$ of the through-hole 12a of the small end portion 12, a radial thickness $T_{31}$ of the outer ring 31 (specifically, a thickness in a forming region of the raceway surface 31a) satisfies $T_{31}=(0.05\sim0.15)\times D_{12}$.

When a thickness T of an outer ring is smaller than 0.05D, rigidity of the outer rings 21 and 31 is insufficient. Thus, performance as the bearing raceway ring constructing a rolling bearing is prone to reduce, and the outer rings 21 and 31 are prone to deform when being press-fitted into the through-holes 11a and 12a of the connecting rod 10. Meanwhile, when the thickness T of the outer ring is larger than 0.15D, the thicknesses of the outer rings 21 and 31 are larger than necessary, and a weight of the connecting rod module 1 is increased.

In addition, in this embodiment, an interference $I_1$ between the outer ring 21 and the inner peripheral surface of the large end portion 11 (peripheral wall of the through-hole 11a), that is, a difference $I_1$ before assembly between an outer diameter dimension $D_{21}$ of the outer ring 21 and the inner diameter dimension $D_{11}$ of the through-hole 11a satisfies $I_1=(0.0004\sim0.004)\times D_{11}$. Similarly, an interference $I_2$ between the outer ring 31 and the inner peripheral surface of the small end portion 12 (peripheral wall of the through-hole 12a), that is, a difference $I_2$ before assembly between an outer diameter dimension $D_{31}$ of the outer ring 31 and the inner diameter dimension $D_{12}$ of the through-hole 12a satisfies $I_2=(0.0004\sim0.004)\times D_{12}$.

When an interference I is smaller than 0.0004D, a fixing force is insufficient, with the result that the outer rings 21 and 31 are moved with respect to the connecting rod 10. Thus, unbalanced load is applied to the roller bearings 20 and 30, thereby causing abnormal abrasion. Meanwhile, when the interference I is larger than 0.004D, the outer rings 21 and 31 are deformed when being press-fitted into the through-holes 11a and 12a of the connecting rod 10. As a result, the circularities are increased, and noise and reduction in bearing lifetime are caused.

As described above, the connecting rod 10 is formed of the sintered metal, and the outer rings 21 and 31 are formed of a hard material. In addition, the radial thicknesses T of the outer rings 21 and 31, and the interferences I between the outer ring 21 and the connecting rod 10 and between the outer ring 31 and the connecting rod 10 are set within predetermined ranges. In this manner, distortion of the outer rings 21 and 31 can be prevented, and degradation of the circularities of the raceway surfaces 21a and 31a can be prevented.

Now, a method of manufacturing the connecting rod 10 is described. The connecting rod 10 is manufactured through a compacting step, a sintering step, and a sizing step.

Figure 4:
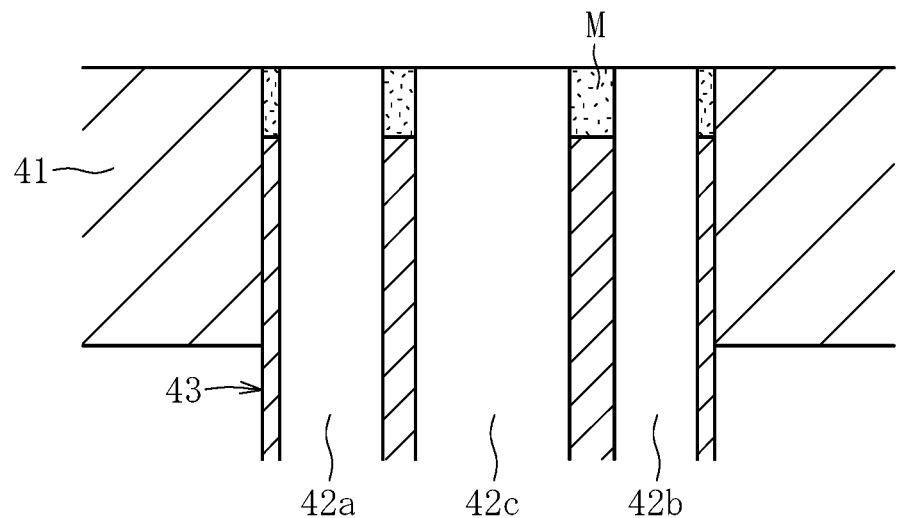
FIG. 4 is a sectional view for illustrating a compacting step for the above-mentioned connecting rod under a state in which raw material powder is filled into a die.
Figure 5:
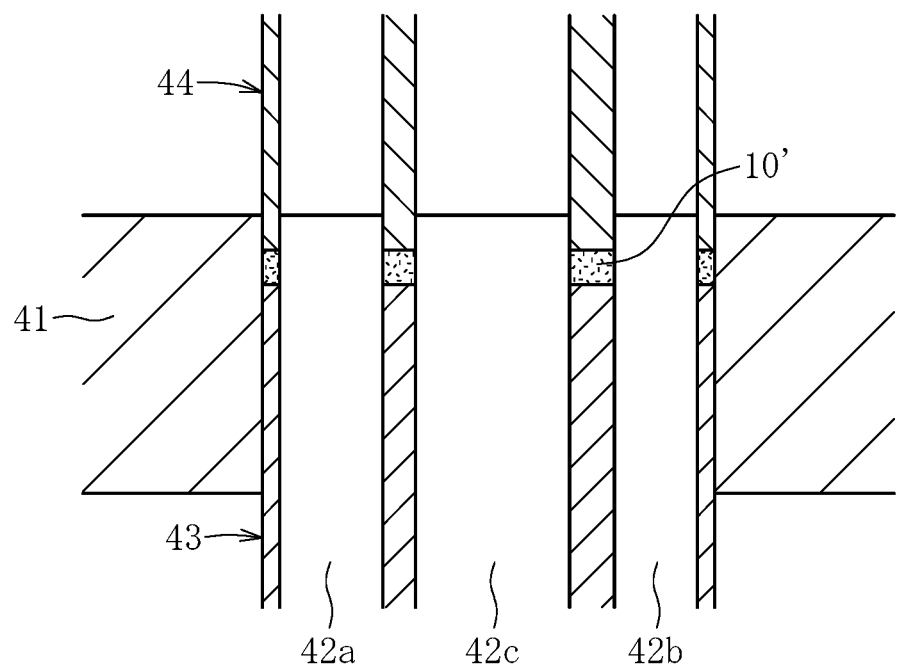
FIG. 5 is a sectional view for illustrating the compacting step for the above-mentioned connecting rod under a state in which the raw material powder is compressed.

In the compacting step, first, various kinds of powder are mixed together and formed into raw material powder. In this embodiment, as the raw material powder, there is used powder containing completely alloyed steel powder (pre-alloyed powder) of iron, nickel, and molybdenum, and containing graphite powder as carbon powder. The raw material powder is filled into a forming die and undergoes compression molding, to thereby be molded into a green compact. Specifically, as illustrated in FIG. 4, raw material powder M is filled into a cavity defined by a die 41, core rods 42a, 42b, and 42c, and a lower punch 43. Then, as illustrated in FIG. 5, an upper punch 44 is lowered to compress the raw material powder M, thereby molding a green compact 10' having substantially the same shape as that of the connecting rod 10 illustrated in FIG. 2 and FIG. 3.

In the sintering step, the green compact 10' is sintered at a predetermined temperature for a predetermined time period. Thus, a sintered compact is obtained.

Figure 6:
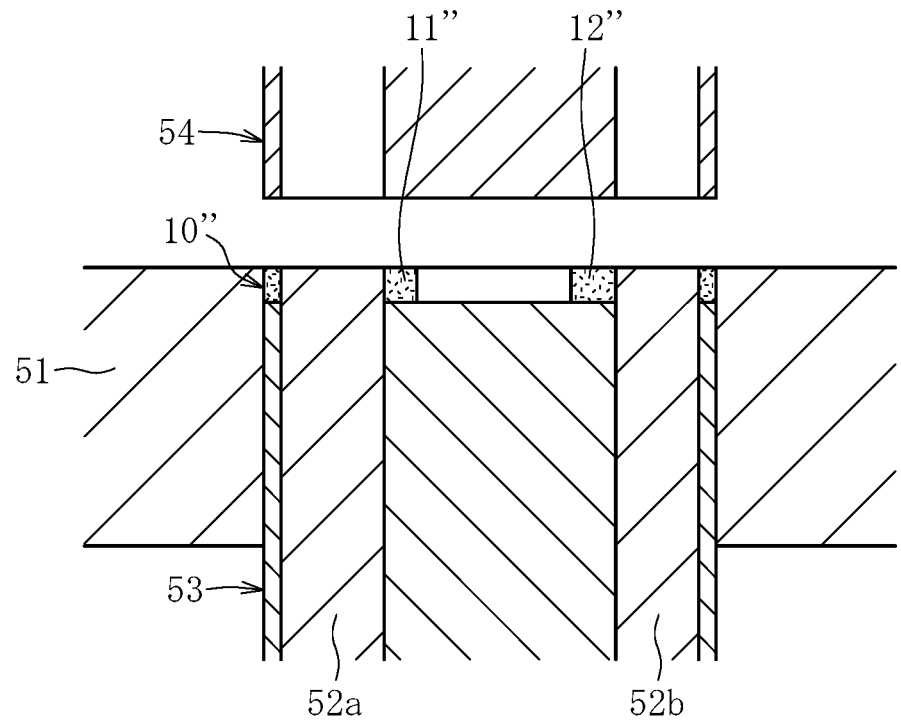
FIG. 6 is a sectional view for illustrating a sizing step for the above-mentioned connecting rod under a state before a sintered compact is compressed.
Figure 7:
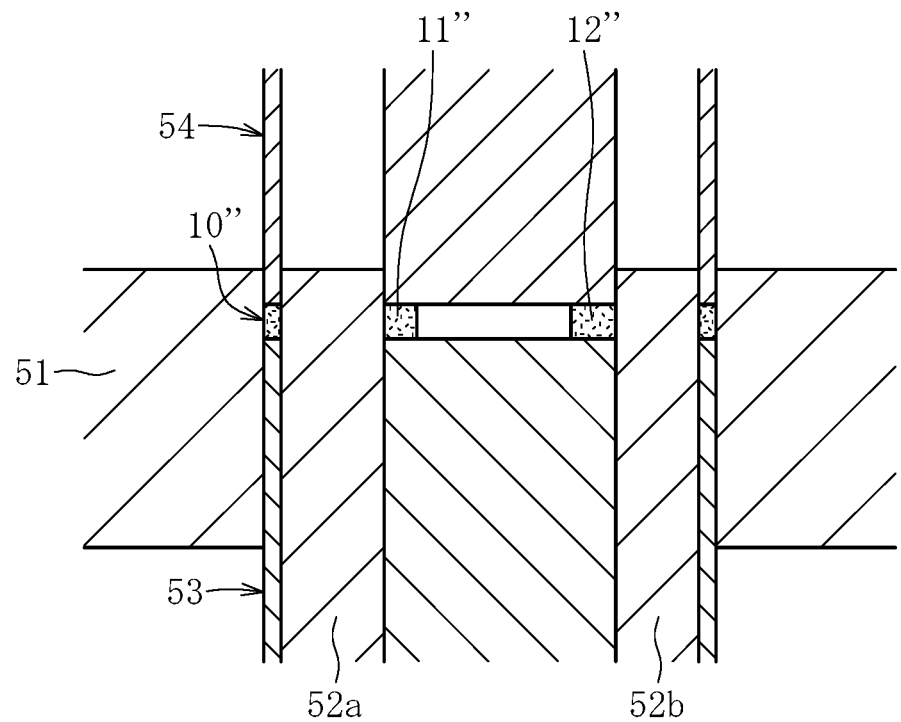
FIG. 7 is a sectional view for illustrating the sizing step for the above-mentioned connecting rod under a state in which the sintered compact is compressed.

In the sizing step, the sintered compact is recompressed, and thus is increased in accuracy of dimension. Thus, the connecting rod 10 is obtained. In this embodiment, particularly outer peripheral surfaces and inner peripheral surfaces of a large end portion 11" and a small end portion 12" of a sintered compact 10" are molded. Specifically, first, as illustrated in FIG. 6, the sintered compact 10" is placed in a space defined by a die 51 and core rods 52a and 52b. Then, as illustrated in FIG. 7, the sintered compact 10" is pushed into the die 51 along an inner periphery of the die 51 by an upper punch 54. Thus, the sintered compact 10" is press-fitted into the die 51 and compressed by the upper punch 54 and the lower punch 53. In this manner, the outer peripheral surfaces of the large end portion 11" and the small end portion 12" of the sintered compact 10" are molded by an inner peripheral surface of the die 51, and the inner peripheral surface of the large end portion 11" and the inner peripheral surface of the small end portion 12" are molded by an outer peripheral surface of the core rod 52a and an outer peripheral surface of the core rod 52b, respectively. Further, a relative positional relationship between the inner peripheral surface of the large end portion 11" and the inner peripheral surface of the small end portion 12" is corrected by the core rods 52a and 52b. After that, the connecting rod 10 is released from a sizing die.

The outer rings 21 and 31 are respectively press-fitted into the through-hole 11a of the large end portion 11 and the through-hole 12a of the small end portion 12 of the connecting rod 10 that is formed as described above. After that, the rollers 22 and the cage 23 are assembled to the inner periphery of the outer ring 21, and the rollers 32 and the cage 33 are assembled to the inner periphery of the outer ring 31. In this manner, the connecting rod module 1 illustrated in FIG. 1 is completed.

The present invention is not limited to the above-mentioned embodiment. For example, the configuration of the connecting rod 10 is not limited to the above-mentioned configuration. In a region forming the through-hole 13a of the stem portion 13, a thin portion that is thinner than the other regions may be formed, or the entire stem portion 13 may be thinned. Alternatively, the through-hole 13a of the stem portion 13 may be omitted, and the stem portion 13 may be thick and solid similarly the large end portion 11 and the small end portion 12.

Further, in the above-mentioned embodiment, description is made of the case where the outer rings 21 and 31 are press-fitted into both the through-hole 11a of the large end portion 11 and the through-hole 12a of the small end portion 12 of the connecting rod 10, but the present invention is not limited thereto. There may be adopted such a configuration that the outer ring is press-fitted into one of the through-hole 11a of the large end portion 11 and the through-hole 12a of the small end portion 12 of the connecting rod 10, and that the outer ring is not press-fitted into another one of the through-holes 11a and 12a. Specifically, for example, the outer ring is press-fitted into the through-hole 12a of the small end portion 12, whereas the large end portion 13 is divided into a connecting rod body and a cap member. The connecting rod body and the cap member can be fixed to each other with a bolt or the like.

Further, also the configurations of the roller bearings 20 and 30 are not limited to the above-mentioned configurations. For example, as one of or both of the roller bearing 20 and the roller bearing 30, there may be adopted a roller bearing of a so-called shell type in which a collar portion is formed at each axial end of an outer ring to protrude to a radially inner side, and is configured to retain rollers and a cage so as to prevent the rollers and the cage from slipping out of the outer ring.

Example 1

In order to confirm effects of the present invention, a bearing raceway ring (outer ring) was press-fitted into a connecting rod formed of a sintered metal, and a circularity and a cylindricity of a raceway surface (inner peripheral surface of an outer ring) were measured. The connecting rod was formed of a sintered metal having a Young's modulus of from 120 GPa or more to 180 GPa or less. The outer ring was formed of a material having a Young's modulus of from more than 180 GPa to 240 GPa or less.

Dimensions of the outer ring and the connecting rod are shown in Table 1 below. As the outer ring, outer rings each having a radial thickness T of 1 mm (Example 1 to Example 9), and outer rings each having a radial thickness T of 1.5 mm (Example 10 to Example 18) were used. As the connecting rod, connecting rods each having a through-hole having an inner diameter dimension D of 16 mm (Example 1 to Example 9), and connecting rods each having a through-hole having an inner diameter dimension D of 17 mm (Example 10 to Example 18) were used. An interference I between the outer ring and the connecting rod was set to 10 μm (Example 1 to Example 3 and Example 10 to Example 12), 20 μm (Example 4 to Example 6 and Example 13 to Example 15), or 30 μm (Example 7 to Example 9 and Example 16 to Example 18).

was prevented so that the raceway surface having excellent circularity and cylindricity was obtained.

Further, in all of Examples, an extraction load was 250 N or more. Particularly in Example 4 to Example 9 and Example 13 to Example 18 in which the interference I was set to 20 μm or more (I/D≥0.001), the extraction load was 900 N or more. Therefore, in Example 4 to Example 9 and Example 13 to Example 18, it was confirmed that both of excellent circularity of the raceway surface of the outer ring, and firm fixing between the connecting rod and the outer ring could be achieved.

REFERENCE SIGNS LIST 1 connecting rod module
10 connecting rod
11 large end portion
11a through-hole
12 small end portion
12a through-hole
13 stem portion
20, 30 roller bearing
21, 31 outer ring (bearing raceway ring)
21a, 31a raceway surface
23, 33 cage

The invention claimed is:
1. A method of manufacturing a connecting rod module, comprising the steps of:
   forming a green compact, which comprises a large end portion, a small end portion, and a coupling portion for coupling the large end portion and the small end portion to each other;

TABLE 1

| | Thickness of outer ring T [mm] | Press-fitting interference I [mm] | Inner diameter of connecting rod D [mm] | T/D | I/D | Circularity of connecting rod [μm] (Before press-fitting outer ring) | Cylindricity of connecting rod [μm] (Before press-fitting outer ring) | Circularity of connecting rod [μm] (After press-fitting outer ring) | Cylindricity of connecting rod [μm] (After press-fitting outer ring) | Extraction load [N] |
|---|---|---|---|---|---|---|---|---|---|---|
| Example 1 | 1 | 0.01 | 16 | 0.063 | 0.00063 | 1.3 | 2.1 | 2.8 | 3.9 | 568 |
| Example 2 | 1 | 0.01 | 16 | 0.063 | 0.00063 | 3.4 | 3.8 | 1.4 | 2.3 | 629 |
| Example 3 | 1 | 0.01 | 16 | 0.063 | 0.00063 | 5.3 | 6.8 | 2.8 | 3.5 | 501 |
| Example 4 | 1 | 0.02 | 16 | 0.063 | 0.00125 | 2.0 | 3.3 | 7.0 | 9.1 | 1,079 |
| Example 5 | 1 | 0.02 | 16 | 0.063 | 0.00125 | 1.8 | 2.9 | 3.7 | 5.8 | 980 |
| Example 6 | 1 | 0.02 | 16 | 0.063 | 0.00125 | 2.4 | 3.2 | 5.8 | 7.1 | 917 |
| Example 7 | 1 | 0.03 | 16 | 0.063 | 0.00188 | 1.1 | 2.9 | 8.5 | 10.4 | 1,300 |
| Example 8 | 1 | 0.03 | 16 | 0.063 | 0.00188 | 2.1 | 3.7 | 10.1 | 13.8 | 1,380 |
| Example 9 | 1 | 0.03 | 16 | 0.063 | 0.00188 | 1.2 | 4.5 | 6.9 | 8.5 | 1,360 |
| Example 10 | 1.5 | 0.01 | 17 | 0.088 | 0.00059 | 3.4 | 6.1 | 1.8 | 2.8 | 287 |
| Example 11 | 1.5 | 0.01 | 17 | 0.088 | 0.00059 | 5.9 | 9.0 | 3.9 | 4.8 | 359 |
| Example 12 | 1.5 | 0.01 | 17 | 0.088 | 0.00059 | 8.5 | 9.1 | 3.7 | 5.3 | 334 |
| Example 13 | 1.5 | 0.02 | 17 | 0.088 | 0.00118 | 9.7 | 13.4 | 7.0 | 9.6 | 1,119 |
| Example 14 | 1.5 | 0.02 | 17 | 0.088 | 0.00118 | 11.8 | 14.9 | 8.4 | 11.2 | 1,155 |
| Example 15 | 1.5 | 0.02 | 17 | 0.088 | 0.00118 | 12.1 | 17.3 | 6.8 | 10.7 | 1,073 |
| Example 16 | 1.5 | 0.03 | 17 | 0.088 | 0.00176 | 8.9 | 14.1 | 7.0 | 8.4 | 1,132 |
| Example 17 | 1.5 | 0.03 | 17 | 0.088 | 0.00176 | 13.1 | 17.6 | 10.5 | 14.5 | 1,350 |
| Example 18 | 1.5 | 0.03 | 17 | 0.088 | 0.00176 | 10.7 | 15.3 | 10.1 | 11.4 | 1,210 |

As a result, in all of Example 1 to Example 18, both the circularity and the cylindricity were represented by excellent values of 15 μm or less. Further, in Example 1 to Example 18, a ratio of T/D is set within a range of from 0.05 to 0.15 (specifically, from 0.06 to 0.10), and a ratio of I/D is set within a range of from 0.0004 to 0.004 (specifically, from 0.0005 to 0.002). Based on the above-mentioned facts, it was confirmed that by satisfying the numerical ranges of the present invention, deformation of the bearing raceway ring after the outer ring was press-fitted into the connecting rod sintering the green compact to form a sintered compact;
sizing the sintered compact to form a connecting rod formed of a sintered metal; and
press-fitting a bearing raceway ring into at least one of a through-hole formed in the large end portion of the connecting rod and a through-hole formed in the small end portion of the connecting rod,
wherein the connecting rod has a Young's modulus of from 120 GPa or more to 180 GPa or less, wherein the bearing raceway ring has a Young's modulus of from more than 180 GPa to 240 GPa or less, and when T represents a radial thickness of the bearing raceway ring, D represents an inner diameter dimension of the through-hole into which the bearing raceway ring is press-fitted, and I represents an interference between the bearing raceway ring and a peripheral wall of the through-hole, the following equations are established:

$T = (0.05 \sim 0.15) \times D$; and $I = (0.0004 \sim 0.004) \times D$.

2. A method of manufacturing a connecting rod module according to claim 1,
wherein the sintered metal of the connecting rod contains 0.1% to 5% by mass of nickel, 0.1% to 3% by mass of molybdenum, and 0.05% to 1% by mass of carbon, and contains iron as the remaining composition.

3. A method of manufacturing a connecting rod module according to claim 1,
wherein a density of the sintered metal of the connecting rod is set to 7.0 g/cm$^3$ or more.

* * * * *